United States Patent
Aruga et al.

(10) Patent No.: US 9,004,694 B2
(45) Date of Patent: Apr. 14, 2015

(54) PROJECTION TYPE DISPLAY DEVICE USED WITH ANOTHER PROJECTION TYPE DISPLAY DEVICE FOR PROJECTING OVERLAPPING IMAGES, DISPLAY SYSTEM, AND DISPLAY

(71) Applicant: Seiko Epson Corporation, Tokyo (JP)

(72) Inventors: Tadanori Aruga, Torrance, CA (US); Yutaka Yasuda, Matsumoto (JP); Toru Katahira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 237 days.

(21) Appl. No.: 13/746,922

(22) Filed: Jan. 22, 2013

(65) Prior Publication Data

US 2013/0258289 A1    Oct. 3, 2013

(30) Foreign Application Priority Data

Mar. 29, 2012 (JP) ................................. 2012-075873

(51) Int. Cl.
*G03B 21/26* (2006.01)
*G09G 5/00* (2006.01)
*H04N 9/31* (2006.01)

(52) U.S. Cl.
CPC *G03B 21/26* (2013.01); *G09G 5/00* (2013.01); *H04N 9/31* (2013.01); *H04N 9/3147* (2013.01); *H04N 9/3194* (2013.01); *H04N 2201/0032* (2013.01)

(58) Field of Classification Search
CPC ... G09G 5/003; G09G 3/001; G09G 2340/12; G03B 21/14; H04N 21/60
USPC .................................. 353/30, 121; 345/1.2, 2.2
See application file for complete search history.

(56) References Cited

U.S. PATENT DOCUMENTS

| | | | |
|---|---|---|---|
| 6,545,685 B1 * | 4/2003 | Dorbie | ......................... 345/582 |
| 6,698,898 B2 | 3/2004 | Terami et al. | |
| 7,059,722 B2 | 6/2006 | Matoba et al. | |

FOREIGN PATENT DOCUMENTS

| | | |
|---|---|---|
| JP | A-2002-287242 | 10/2002 |
| JP | A-2003-152375 | 5/2003 |
| JP | A-2004-013632 | 1/2004 |
| JP | A-2006-350359 | 12/2006 |

* cited by examiner

*Primary Examiner* — Toan Ton
*Assistant Examiner* — Magda Cruz
(74) *Attorney, Agent, or Firm* — Oliff PLC (57) ABSTRACT

A display system displays images projected by a plurality of projection type display devices so as to overlap each other. When a user uses this system, events occurring in these devices can be reliably delivered to the user. A commander and a slave project and display images so as to overlap each other. When a notification-required event occurs in the commander or the slave, the commander specifies this notification-required event. Then, the commander displays a first OSD image between the first OSD image and a second OSD image, which form an image corresponding to the specified notification-required event, in a predetermined region of a first screen of screens on which images are displayed. Also, the commander outputs to the slave a control signal to display the second OSD image in the predetermined region. The slave displays the second OSD image in the predetermined region when the control signal is received.

16 Claims, 7 Drawing Sheets

PROJECTION TYPE DISPLAY DEVICE USED WITH ANOTHER PROJECTION TYPE DISPLAY DEVICE FOR PROJECTING OVERLAPPING IMAGES, DISPLAY SYSTEM, AND DISPLAY

BACKGROUND

1. Technical Field

The present invention relates to a technique for notifying a user of events occurring in a plurality of projection type display devices in a system that displays an image using the plurality of projection type display devices.

2. Related Art

There is a technique for notifying a user of an event that has occurred in a projection type display device (so-called projector) that projects and displays an image on a screen or the like. The event referred to herein is an event that should be given to a user as a warning in order to safely operate the projection type display device, for example. JP-A-2003-152375 discloses a technique for notifying a user of an event that an air filter is clogged by making a projector display an OSD (On-Screen Display) image showing a warning message. JP-A-2004-013632 discloses a technique for notifying a system administrator or the like of the location of the malfunction occurring in a projector by sending an e-mail.

Incidentally, there is a system in which a plurality of projection type display devices project images using a method called a "stack". When the technique disclosed in JP-A-2003-152375 is applied to this system, if the clogging of an air filter occurs in a certain projection type display device, the projection type display device projects an OSD image to notify a user of the event. In this system, however, the OSD image and images projected by the other projection type display devices are displayed so as to overlap each other. For this reason, since a warning message shown in the OSD image and a picture, text, and the like shown in the other images are mixed, it is difficult to deliver the content shown in the OSD image to the user. In addition, when the technique disclosed in JP-A-2004-013632 is applied to this system, if a user who is a transmission destination of an e-mail is not present in the place, the notified content is not delivered to the user who is using the display system.

SUMMARY

An advantage of some aspects of the invention is to reliably notify a user, who uses a system that displays images projected by a plurality of projection type display devices so as to overlap each other, of events occurring in these devices.

An aspect of the invention is directed to a projection type display device including: a first display unit that projects and displays an image on a first screen; a specification unit that specifies, on the basis of data acquired from another projection type display device that projects and displays an image on a second screen or data acquired from the projection type display device, an event occurring in a device of an acquisition source of the data; a control unit that controls the first display unit to display a first configuration image between the first configuration image and a second configuration image, which form an image corresponding to the specified event, in a predetermined region of the first screen when the event is specified by the specification unit; and an output unit that outputs a control signal, which causes the other projection type display device to display the second configuration image such that the second configuration image overlaps the predetermined region when outer edges of the first and second screens match with each other, when the event is specified by the specification unit.

According to the aspect of the invention, when a user uses a system in which a projection type display device and another projection type display device, that is, a plurality of projection type display devices project and display images so as to overlap each other, the first and second configuration images are not mixed with other images. Therefore, events occurring in these devices can be reliably delivered to the user.

In a preferable aspect of the invention, the specification unit specifies not only the event that has occurred but also a projection type display device in which the event has occurred, the control unit makes the first display unit display a first configuration image between the first configuration image and a second configuration image which form an image corresponding to the event and the projection type display device specified by the specification unit, and the output unit outputs a control signal to display the second configuration image on the other projection type display device.

According to this preferable aspect of the invention, not only the device in which the event has occurred but also events occurring in a plurality of projection type display devices can be reliably delivered to the user.

In another preferable aspect of the invention, the control unit makes the first display unit display an image, which shows a result specified by the specification unit, as the first configuration image, and the output unit outputs a control signal to display the same image as the first configuration image on the other projection type display device as the second configuration image.

According to this preferable aspect of the invention, it is possible to display a brighter image than when an image showing the specified result is displayed using one projection type display device.

In still another preferable aspect of the invention, the control unit displays the first configuration image in a predetermined color, and the output unit outputs a control signal to display the second configuration image that shows a result specified by the specification unit in a color distinguishable from the predetermined color.

According to this preferable aspect of the invention, when changing the image showing the specified result, it is possible to display an image that the user can see easily even if the first and second configuration images are not synchronized with each other.

In yet another preferable aspect of the invention, the control unit displays the first configuration image that shows a result specified by the specification unit in a color distinguishable from a predetermined color, and the output unit outputs a control signal to display the second configuration image in the predetermined color.

According to this preferable aspect of the invention, when changing the image showing the specified result, it is possible to display an image that the user can see easily even if the first and second configuration images are not synchronized with each other.

In still yet another preferable aspect of the invention, when an event occurs in the other projection type display device, the other projection type display device transmits data indicating the event to the projection type display device, and the specification unit specifies an event, which is indicated by the data received from the other projection type display device, as the event that has occurred in the other projection type display device.

According to this preferable aspect of the invention, since the event is specified only by the data indicating the event, it is possible to reduce the communication load performed between one projection type display device and another projection type display device, compared with a case where the event is specified by determining the occurrence of an event on the basis of different data from the data indicating the event.

The invention may be regarded not only as the projection type display device but also as a display system including the projection type display device and a display method.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments

Hereinafter, embodiments of the invention will be described with reference to the accompanying drawings.

Figure 1:
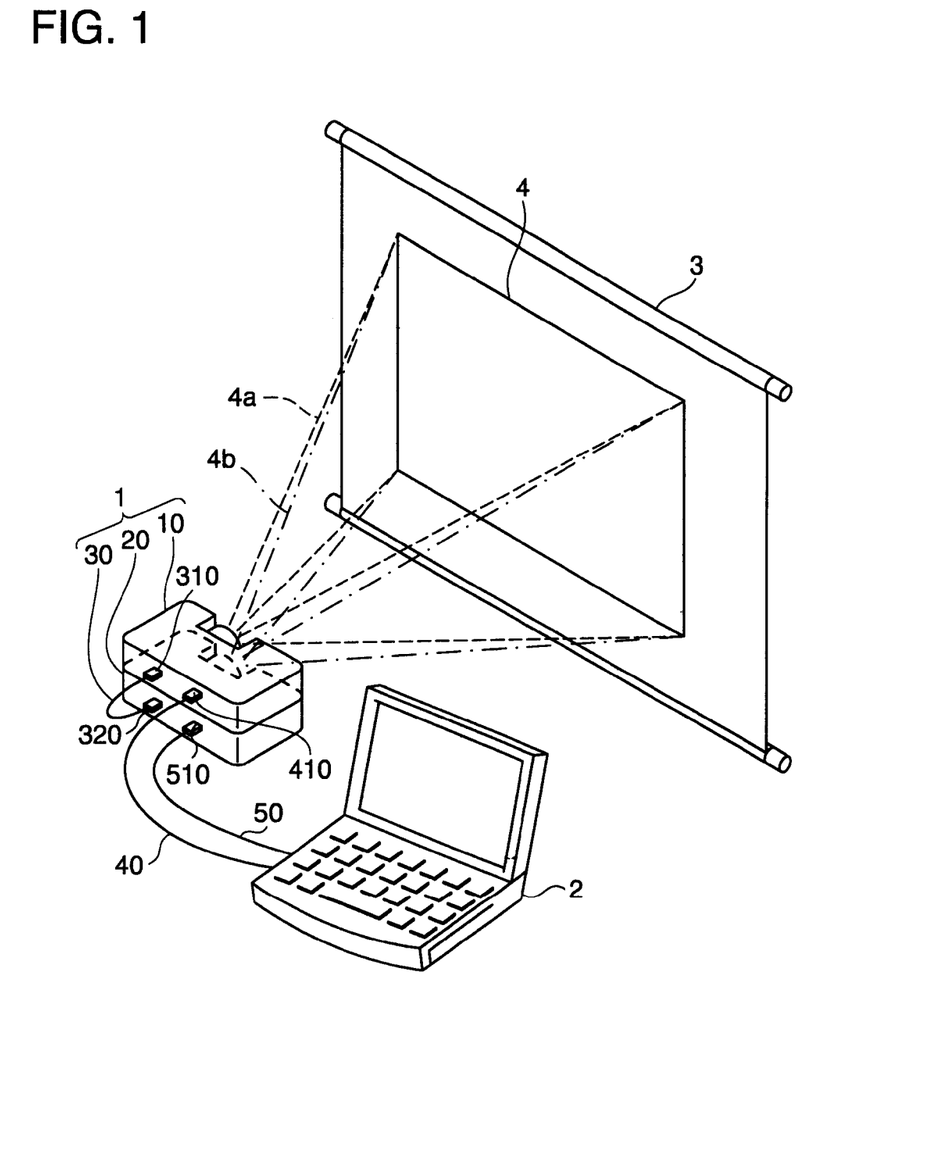
FIG. 1 is a view showing the appearance of a display system according to an embodiment.

FIG. 1 is a view showing the appearance of a display system 1 according to an embodiment. The display system 1 includes a commander (master) 10, a slave 20, and a communication line 30. The commander 10 and the slave 20 are projection type display devices (so-called projectors) that project and display an image. The communication line 30 has connectors 310 and 320 at both ends. The connector 310 is connected to the commander 10, and the connector 320 is connected to the slave 20. Thus, the communication line 30 is connected to both the commander 10 and the slave 20, so that the commander 10 and the slave 20 can communicate with each other through the communication line 30. In addition, the commander 10 and the slave 20 are connected to a PC (Personal Computer; this may be a notebook type personal computer or a tablet type personal computer) 2 through cables 40 and 50, respectively. The cable 40 has a connector 410 at one end, and the connector 410 is connected to the commander 10. In addition, the cable 50 has a connector 510 at one end, and the connector 510 is connected to the slave 20. In addition, connection between each of the commander 10 and the slave 20 and the PC 2 may be made through a hub, or a so-called cascade connection may be made in which one projector is connected to the PC 2 through the other projector.

The PC 2 is an apparatus that generates or stores data showing images (called image data). The images referred to herein include a still image such as a photograph or a moving image (also called a video) such as a movie. The PC 2 transmits the image data to the commander 10 and the slave 20 through the cables 40 and 50, respectively. The commander 10 and the slave 20 project images, which are indicated by the image data transmitted from the PC 2, toward a screen 3. Hereinbelow, in the screen 3, the region where an image projected by the commander 10 is displayed is called a "first screen" 4a, and the region where an image projected by the slave 20 is displayed is called a "second screen" 4b. In the display system 1, the user who uses the system performs adjustment such that the outer edges of the first and second screens 4a, 4b match with each other. Specifically, setting of the sizes or shapes of the first and second screens 4a, 4b, the focus of the images displayed on these screens, and the like is adjusted. The region formed by the overlapping of the first and second screens 4a, 4b is called a "display region" hereinbelow. In FIG. 1, a display region 4 is shown. In the display region 4, images projected from the commander 10 and the slave 20 are displayed so as to overlap each other.

As described above, "a plurality of projectors display images in a display region so as to overlap each other" is called a stack display. The stack display is used to display a 3D image by overlapping an image for the left eye and an image for the right eye, for example. In addition, the stack display is used to display a brighter image by adding light beams projected from a plurality of projectors when the brightness of a displayed image is not sufficient with only one projector. When adding light beams as described above, the PC 2 transmits image data showing the same image to the commander 10 and the slave 20. The commander 10 and the slave 20 display images indicated by the image data transmitted thereto, that is, the same images in the display region 4. As a result, these images are displayed so as to overlap each other. In the display system 1, the outer edges of the first and second screens match with each other as described above. Accordingly, since a picture or text shown in each image is not viewed as a double image, these images are displayed as one image.

When the stack display is performed, the commander 10 and the slave 20 operate in a stack display mode. In the stack display mode, the commander 10 transmits a command, which instructs the slave 20 to perform a predetermined operation, through the communication line 30, for example. On the other hand, the slave 20 operates on the basis of the command transmitted from the commander 10 and does not receive other operations.

Figure 2:
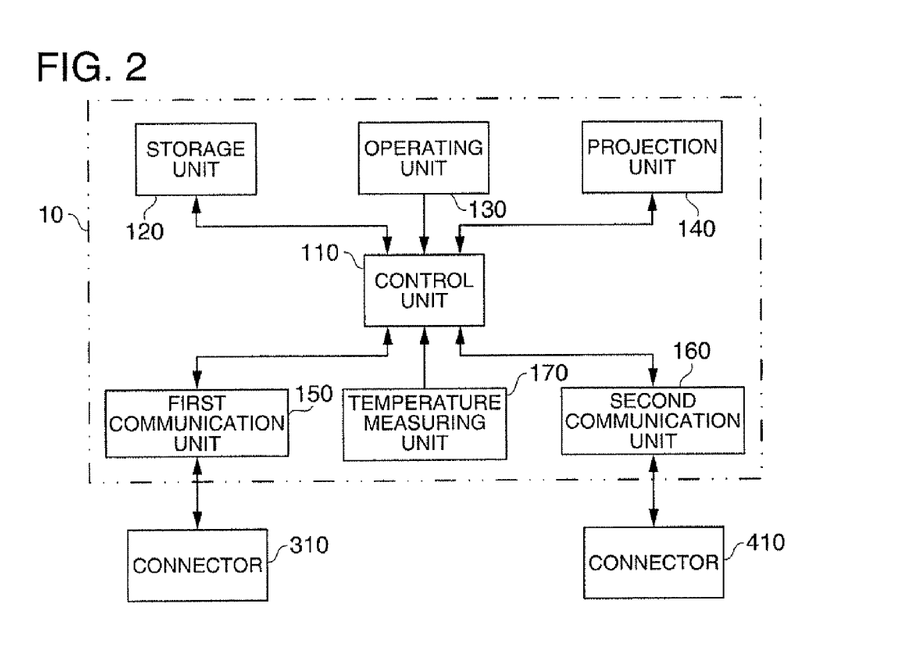
FIG. 2 is a block diagram showing the hardware configuration of a commander.

FIG. 2 is a block diagram showing the hardware configuration of the commander 10. The commander 10 includes a control unit 110, a storage unit 120, an operating unit 130, a projection unit 140, a first communication unit 150, a second communication unit 160, and a temperature measuring unit 170. The control unit 110 includes a computing device, such as a CPU (Central Processing Unit), and storage devices, such as a ROM (Read Only Memory) and a RAM (Random Access Memory). The CPU controls the operation of each unit of the commander 10 by executing programs, which are stored in the ROM or the storage unit 120, using the RAM as a work area. The storage unit 120 has a magnetic or optical recording device or a semiconductor memory device, and stores various programs including a control program and data, such as various setting values. The operating unit 130 is connected to the control unit 110. The operating unit 130 includes various switches and an indicator lamp, and may include an operation panel disposed on the exterior housing (not shown) of the commander 10 or may include a light receiving section that receives an infrared signal from a so-called remote (remote controller).

The projection unit 140 is a display unit that projects and displays an image indicated by the image data. Specifically, the projection unit 140 includes a discharge lamp having two electrodes, which are disposed so as to be spaced apart from each other, and a liquid crystal panel (not shown) that modulates light according to the image data, for example. When a voltage is applied, the discharge lamp emits light by discharge generated between the two electrodes, and emits the light in a predetermined direction. The liquid crystal panel is driven according to the image data, and modulates the light emitted from the discharge lamp so as to display an image shown by the image data. The projection unit 140 projects the light modulated by the liquid crystal panel and displays an image expressed by the light on the screen 3 shown in FIG. 1, for example. In addition, the projection unit 140 includes a measurement unit that measures used hours (use time) of the discharge lamp. This measurement unit supplies data indicating the measured use time to the control unit 110.

The first communication unit 150 has a connector, and this connector is connected to the connector 310 of the communication line 30. The first communication unit 150 transmits or receives data to or from the slave 20 through the communication line 30 connected as described above. The second communication unit 160 has a connector, and this connector is connected to the connector 410 of the cable 40 shown in FIG. 1. The second communication unit 160 receives the image data transmitted from the PC 2 through the cable 40 connected as described above. The temperature measuring unit 170 is a unit that measures the temperature of a predetermined location inside the commander 10 (for example, temperature near the discharge lamp). The temperature measuring unit 170 supplies data indicating the measured temperature to the control unit 110.

Figure 3:
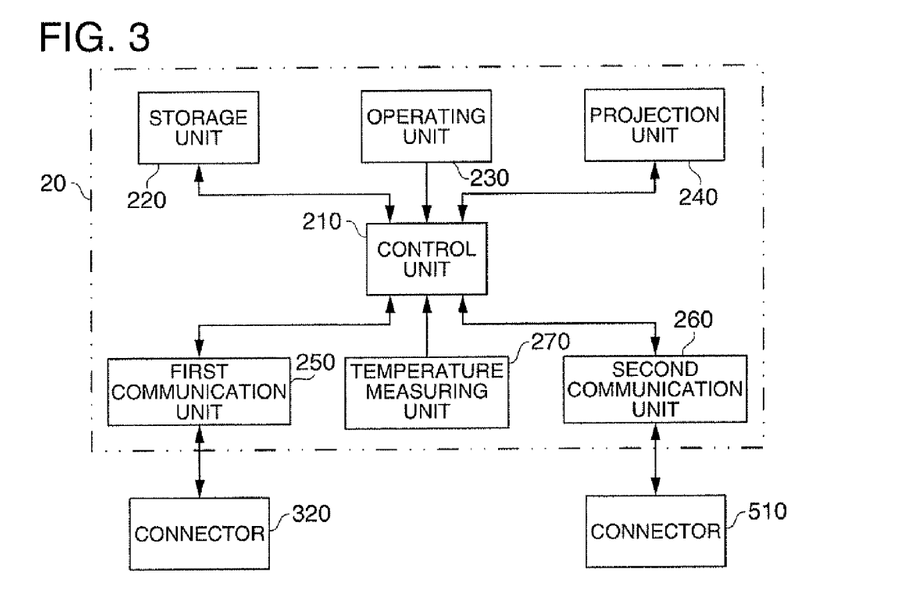
FIG. 3 is a block diagram showing the hardware configuration of a slave.

FIG. 3 is a block diagram showing the hardware configuration of the slave 20. The slave 20 includes the hardware in common with the commander 10. That is, the slave 20 includes a control unit 210, a storage unit 220, an operating unit 230, a projection unit 240, a first communication unit 250, a second communication unit 260, and a temperature measuring unit 270. In the slave 20, however, unlike the commander 10, a connector of the first communication unit 250 is connected to the connector 320 of the communication line 30, and a connector of the second communication unit 260 is connected to the connector 510 of the cable 50. In addition, a program stored in the storage unit of the slave 20 is different from that in the commander 10. Accordingly, the slave 20 performs a different operation from the commander 10. In the commander 10 and the slave 20, each control unit executes a program to control each unit, thereby realizing the function shown below.

Figure 4:
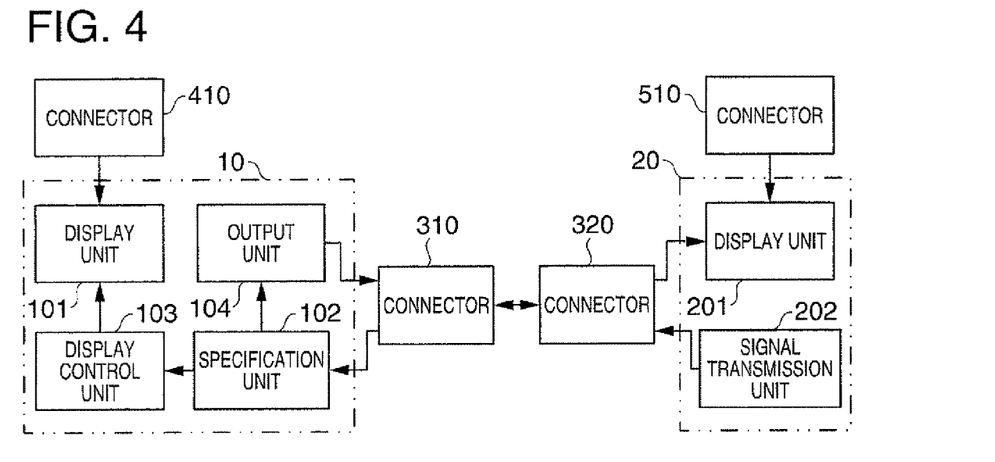
FIG. 4 is a block diagram showing the functional configuration of the display system.

FIG. 4 is a block diagram showing the functions realized by the commander 10 and the slave 20. In the display system 1, the commander 10 is an example of a first projection type display device, and the slave 20 is an example of a second projection type display device. The commander 10 includes a display unit 101, a specification unit 102, a display control unit 103, and an output unit 104. In addition, the slave 20 includes a display unit 201 and a signal transmission unit 202.

The display unit 101 (examples of a first display unit and a display unit) is a unit that is connected to the connector 410 of the cable 40 shown in FIG. 1 and that projects an image, which is indicated by the image data transmitted from the PC 2 through the cable 40, and displays the image on the above-described first screen. The display unit 101 is a function realized by the cooperation of the control unit 110, the projection unit 140, and the second communication unit 160 shown in FIG. 2. In addition, the display unit 201 (an example of a second display unit) is a unit that is connected to the connector 510 of the cable 50 and that projects an image, which is indicated by the image data transmitted from the PC 2 through the cable 50, and displays the image on the above-described second screen. In addition, the display unit 201 is connected to the connector 320 of the communication line 30, and displays an image based on the control signal output from the commander 10. The display unit 201 is a function realized by the cooperation of the control unit 210, the projection unit 240, the first communication unit 250, and the second communication unit 260 shown in FIG. 3.

The specification unit 102 (an example of a specification unit) is a unit that specifies an event, which occurs in its own device (commander 10) or another projection type display device (slave 20), and the projection type display device in which the event has occurred. The event specified by the specification unit 102 is set in advance as an event to be notified to the user who uses the display system 1, and is called a "notification-required event" hereinbelow. In the display system 1, for example, an event (called "temperature excess") in which the temperature inside a projector becomes equal to or higher than the threshold value (called a temperature threshold value), an event (called "lamp use time excess") in which the cumulative value of the used hours after the discharge lamp is attached to the projector becomes equal to or greater than the threshold value (called a time threshold value), and the like are set as notification-required events.

The specification unit 102 is connected to the connector 310 of the communication line 30, so that the specification unit 102 can acquire data from the slave 20 through the communication line 30. On the basis of the data acquired from its own device or the slave 20, the specification unit 102 specifies the notification-required event that has occurred in the device which is an acquisition source of the data. For example, the specification unit 102 acquires data indicating a result (that is, use time) measured by a measurement unit of the projection unit 140 of its own device, and specifies the lamp use time excess on the basis of the acquired data. In addition, the specification unit 102 acquires data indicating a result (that is, temperature) measured by the temperature measuring unit 170 of its own device, and specifies the temperature excess on the basis of the acquired data. In these cases, the specification unit 102 specifies its own device that is an acquisition source of the data, that is, the commander 10 as a projection type display device in which the notification-required event has occurred.

In addition, on the basis of the data acquired from the slave 20, the specification unit 102 specifies the notification-required event occurring in the device (that is, the slave 20) that is the transmission source of the data. Specifically, when the acquired data indicates the notification-required event, the specification unit 102 specifies the notification-required event indicated by the data. In this case, the specification unit 102 specifies the slave 20 as a projection type display device in which the notification-required event has occurred. The specification unit 102 performs the above-described specification for a period during which the measurement unit of the projection unit 140 and each unit of the temperature measuring unit 170 and the first communication unit 150 are operating. This period includes not only a period for which the display unit 101 displays an image but also a period for which each unit of the commander 10 is operating since the power is on but image display by the display unit 101 is not performed, for example. The specification unit 102 is a function realized by the cooperation of the control unit 110, the projection unit 140, the first communication unit 150, and the temperature measuring unit 170. The specification unit 102 supplies the data, which indicates the notification-required event and the projection type display device that have been specified, to the display control unit 103 and the output unit 104.

The signal transmission unit 202 (an example of a signal transmission unit) is connected to the connector 320 of the communication line 30, so that the signal transmission unit 202 can transmit data to the commander 10 through the communication line 30. The signal transmission unit 202 is a unit that specifies the notification-required event when the notification-required event occurs in its own device (slave 20), and transmits data indicating the specified notification-required event to the commander 10. The signal transmission unit 202 specifies the notification-required event on the basis of the measurement results of the measurement unit of the projection unit 240 and the temperature measuring unit 270. In addition, the signal transmission unit 202 transmits the data indicating the specified notification-required event when the notification-required event occurs. The signal transmission unit 202 is a function realized by the cooperation of the control unit 210, the projection unit 240, the first communication unit 250, and the temperature measuring unit 270.

The display control unit 103 (an example of a control unit) is a unit that controls the display unit 101 to display an OSD image when the notification-required event and the device are specified by the specification unit 102. Here, the OSD image is an image indicated by the image data stored in the projector. Examples of the OSD images include an image used for the operation to set the brightness or contrast of an image. The display control unit 103 controls the display unit 101 to display an OSD image in a predetermined region of the first screen described above. This predetermined region is called a "first OSD image region" hereinbelow. Data that indicates the first OSD image region using the coordinates of the coordinate system indicating each position on the first screen is stored in the storage unit 120. On the basis of this data, the display control unit 103 displays the OSD image in the first OSD image region. The OSD image displayed by the display control unit 103 is a first OSD image of the first OSD image (an example of a first configuration image) and the second OSD images (an example of a second configuration image) that form an image corresponding to the notification-required event and the device specified by the specification unit 102. The display control unit 103 turns on the discharge lamp of the projection unit 140 to display the first OSD image while the display unit 101 does not display an image. The display control unit 103 is a function realized by the cooperation of the control unit 110, the storage unit 120, and the projection unit 140.

The output unit 104 (an example of an output unit) is connected to the connector 310 of the communication line 30, so that the output unit 104 can output data to the slave 20 through the communication line 30. The output unit 104 (an example of an output unit) is a unit that outputs a control signal to the slave 20 when the notification-required event and the device are specified by the specification unit 102. This control signal is a signal causing the slave 20 to display the second configuration image such that the second OSD image overlaps the first OSD image region when the outer edges of the first and second screens described above are made to match with each other. In the second screen, the region where the slave 20 displays the second configuration image is called a "second OSD image region". Data that indicates the second OSD image region using the coordinates of the coordinate system indicating each position on the second screen is stored in the storage unit 120. The output unit 104 outputs a control signal to display the second OSD image in the second OSD image region on the basis of this data. The slave 20 that receives this control signal displays the second configuration image in the second OSD image region of the second screen. The output unit 104 is a function realized by the cooperation of the control unit 110, the storage unit 120, and the first communication unit 150. By the operation of the display control unit 103 and the output unit 104, the commander 10 performs control such that the first configuration image is displayed on the display unit 101 and the slave 20 displays the second configuration image.

When the notification-required event occurs in a projector, the electronic circuit is damaged by heat or the discharge lamp stops emitting light due to its lifespan or the like if the projector is continuously used. For this reason, there is a risk of errors, such as a sudden stopping of image display. In the display system 1, in order to prevent the occurrence of such errors, a warning is given to the user by performing a process for notifying the user of the notification-required event. The process in which the display system 1 notifies the user of the notification-required event is called a "notification process" hereinbelow.

Figure 5:
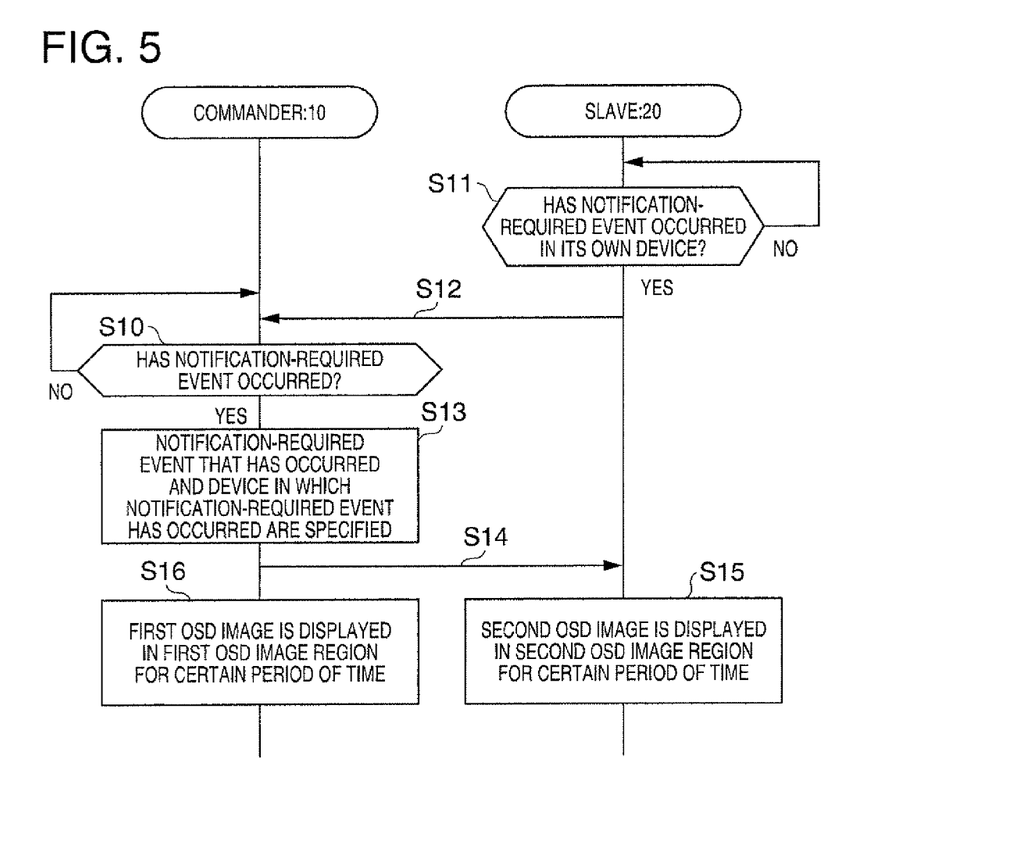
FIG. 5 is a view showing the operation performed by each projector in a notification process.

FIG. 5 is a sequence chart showing an example of the operation performed by the commander 10 and the slave 20 in the notification process. The commander 10 and the slave 20 start the notification process, for example, at the timing when a stack display mode is set or at the timing when the commander 10 and the slave 20 are started in a state where the stack display mode is set. First, the commander 10 determines whether or not the notification-required event has occurred in itself or the slave 20 (step S10). When the determination in step S10 is NO, the commander 10 performs the process of step S10 again. That is, the commander 10 repeatedly performs the process of step S10 at predetermined intervals (for example, every second) while the determination in step S10 is NO, that is, while it is determined that the notification-required event has occurred.

Specifically, the determination in step S10 is performed as follows. The commander 10 determines that the notification-required event has occurred, for example, when the temperature measured by the temperature measuring unit 170 is equal to or higher than the temperature threshold value. In addition, the commander 10 stores the use time of the discharge lamp measured by the measurement unit provided in the projection unit 140, and determines that the notification-required event has occurred when the cumulative value of the stored use time is equal to or greater than the above-described time threshold value. The slave 20 determines whether or not the notification-required event has occurred in itself (step S11), and repeatedly performs the process of step S11 at predetermined intervals (for example, every second) while this determination is NO. When it is determined that the notification-required event has occurred in itself (step S11: YES), the slave 20 transmits to the commander 10 data indicating the notification-required event that has occurred (step S12). Steps S11 and S12 are the operation performed by the signal transmission unit 202 of the slave 20 shown in FIG. 4. On the other hand, the commander 10 determines that the notification-required event has occurred when the data transmitted through the communication line 30 indicates the notification-required event. That is, the commander 10 determines that the notification-required event has occurred in the slave 20 when the data transmitted in step S12 is received.

When the determination in step S10 is YES, the commander 10 specifies the notification-required event that has occurred and the device in which the notification-required event has occurred (step S13). The commander 10 specifies the notification-required event and the device according to the details and transmission source of the data used when the occurrence of the notification-required event is determined in step S10. For example, if the data used in step S10 is supplied from the temperature measuring unit 170, the commander 10 specifies the temperature excess as a notification-required event and specifies its own device as a device in which the temperature excess has occurred. In addition, if this data is supplied from the measurement unit of the projection unit 140, the commander 10 specifies the lamp use time excess as a notification-required event and specifies its own device as a device in which the lamp use time excess has occurred. In addition, if this data is transmitted from the slave 20, the commander 10 specifies the notification-required event indicated by the data and specifies the slave 20 as a device in which the notification-required event has occurred. By performing the operation in steps S10 and S12, the commander 10 specifies the notification-required event, which has occurred in the device of the acquisition source of the data, and the device, in which the notification-required event has occurred, on the basis of the data acquired from its own device or the slave 20. Steps S10 and S12 are the operation performed by the specification unit 102 shown in FIG. 4.

Then, the commander 10 outputs a control signal, which is for displaying the above-described second OSD image in the second OSD image region for a certain period of time (for example, for 10 seconds), to the slave 20 (step S14). This step S14 is the operation performed by the output unit 104 shown in FIG. 4. When the control signal transmitted from the commander 10 is received in step S14, the slave 20 displays the second OSD image in the second OSD image region for a certain period of time (step S15). Then, the commander 10 displays the first OSD image in the first OSD image region for a certain period of time (step S16). This step S16 is the operation performed by the display control unit 103 and the display unit 101. The certain period of time in step S16 is the same time (for example, for 10 seconds) as the period during which the second OSD image is displayed. The commander 10 displays the first OSD image at the time corresponding to the time at which the control signal is output in step S14. In addition, even if the commander 10 does not display an image on the first screen in step S16, the commander 10 turns on the discharge lamp of the projection unit 140 to display the first OSD image. In addition, instead of being ended when a certain period of time elapses, the display of an OSD image may be ended when there is an operation of the user using the operating unit 130. The same is true for OSD images shown hereinbelow. Through the notification process performed as described above, the first and second OSD images are displayed in the display region 4 so as to overlap each other.

Figure 6A:
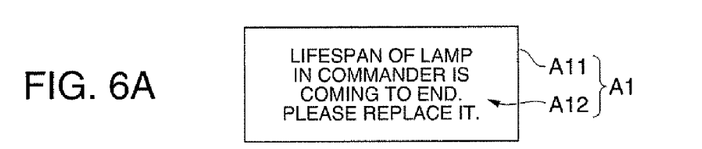
FIGS. 6A to 6D are views showing examples of an OSD image displayed in a display region.
Figure 6B:
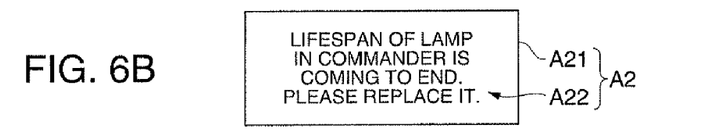

FIGS. 6A to 6D are views showing examples of the first and second OSD images displayed in the notification process. These examples show OSD images displayed when the occurrence of lamp consumption excess in the commander 10 is specified in step S13. FIG. 6A shows a first OSD image A1 displayed by the commander 10, and FIG. 6B shows a second OSD image A2 displayed by the slave 20. The first OSD image A1 has a rectangular image A11 and an image A12 showing the character string "The lifespan of the lamp in the commander is coming to an end. Please replace it". In addition, the second OSD image A2 has a rectangular image A21 and an image A22 showing the character string "The lifespan of the lamp in the commander is coming to an end. Please replace it". In addition, the first and second OSD images A1 and A2 are images having the same size. That is, the first and second OSD images A1 and A2 are the same images.

Figure 6C:
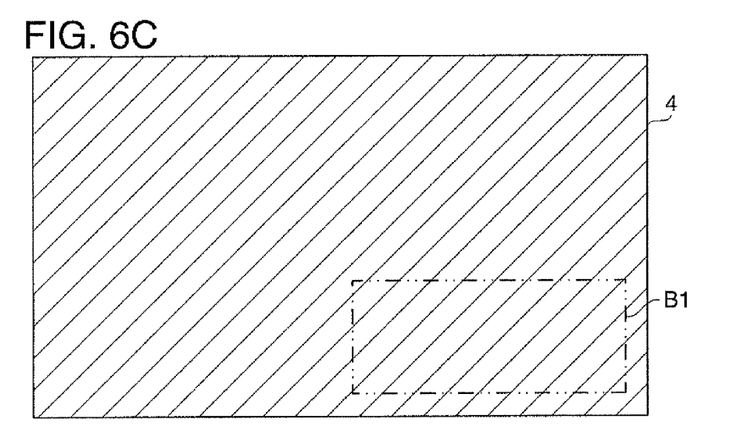
Figure 6D:
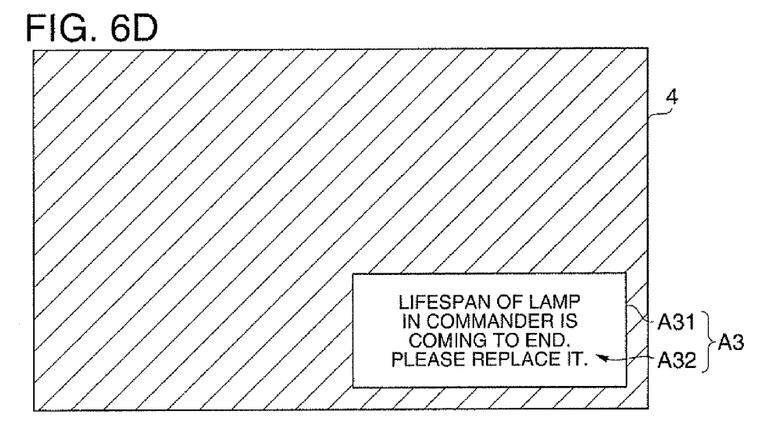

In FIG. 6C, first and second OSD image regions in the display region 4 shown in the FIG. 1 before the first and second OSD images A1 and A2 are displayed are shown by the two-dot chain line. In this example, since the first and second OSD image regions are equal, the region shown by the two-dot chain line is called an OSD image region B1. In FIG. 6C, the image displayed in the display region 4 is hatched. FIG. 6D shows a state where the first and second OSD images A1 and A2 are projected to the OSD image region B1 of the display region 4 shown in FIG. 6C. An OSD image A3 expressed by the first and second OSD images A1 and A2 overlapping each other is displayed in the OSD image region B1. As described above, the first and second OSD images A1 and A2 are the same images. Therefore, similar to the above OSD images, the OSD image A3 also has a rectangular image A31 and an image A32 showing the character string "The lifespan of the lamp in the commander is coming to an end. Please replace it". This character string shows that the lamp use time excess has occurred in the commander. That is, the OSD image A3 is an image corresponding to the notification-required event and the device specified in step S13. Here, the image corresponding to the notification-required event and the device is an image in which the notification-required event and the device themselves, user actions to be executed corresponding to the notification-required event, information that the user should know in order to perform the action, and the like are shown using the character string, symbols, pictures, and the like.

In the case of displaying an OSD image, the commander 10 displays the OSD image on another image so as to overlap the image when displaying another image on the first screen. In this case, in a region where the OSD image is displayed, the commander 10 does not project the image displayed there. In this manner, the OSD image is displayed without being mixed with an image already displayed. Similar to the commander 10, the slave 20 also displays an OSD image. However, if one projector displays an OSD image and another projector continues to display an image as it is during the stack display, the image is mixed with the OSD image. As a result, compared with a case where the OSD image is not mixed with another image as when display is performed using one device, it is difficult to deliver the content shown in the OSD image to the user. In the display system 1, when the commander 10 and the slave 20 perform stack display, these projectors display OSD images (first and second OSD images A1 and A2) in the same region (OSD image region B1). That is, the OSD image A3 in which these OSD images are displayed so as to overlap each other is not mixed with an image already displayed. For this reason, a situation where the character string shown in the OSD image A3 is mixed with other images and it is difficult to see the character string does not occur. Therefore, according to the present embodiment, notification-required events occurring in these projection type display devices (the commander 10 or the slave 20) can be reliably delivered to the user.

In addition, since the first and second OSD images are the same images, the character string shown in the OSD image A3 is brighter than the character strings shown in the first and second OSD images. For this reason, the commander 10 can display a brighter OSD image (in this example, the OSD image A3) than in the case where an OSD image is displayed using one projector.

In addition, a system may be used which displays a notification-required event and a device, which are specified by a projector, on a remote-connected device for management so that they are delivered to the administrator in a remote location. In this case, since only the administrator knows of the notified content, the content notified from the projector is not delivered to the user who is using the display system 1 unless there is contact from the administrator or unless the administrator goes there. The user who is using the display system 1 referred to herein is a user who is watching an image displayed in the display region 4. In the present embodiment, the commander 10 controls itself and the slave 20 so that the OSD image A3 shown in FIG. 6D is displayed in the display region 4. Accordingly, the commander 10 can reliably notify the user who is watching the display region 4, that is, the user who is using the display system 1 of the notification-required event and the device that have been specified. The user who has received this notification can see on the spot the details of the notification-required event that has occurred and in which projector the notification-required event has occurred. For this reason, the user can determine on the spot whether to perform predetermined measures corresponding to the notification-required event that has occurred or to continue to use the device as it is. In addition, when the user performs predetermined measures, an error occurring when the device is continuously used does not occur. As a result, a situation where such an error occurs and the projector can no longer be used does not occur. Thus, the commander 10 can improve the availability of the display system 1, that is, it is possible to increase the time for which the display system 1 is used by the user.

MODIFICATION EXAMPLES

The above-described embodiment is only an example of the implementation of the invention, and may be modified as follows. In addition, the above-described embodiment and each modification example shown below may be combined and executed when necessary.

First Modification Example

Although the commander 10 performs control such that the first and second OSD images, which are the same images, are displayed in the embodiment described above, the commander 10 may perform control such that OSD images, which are not the same images, are displayed as the first and second OSD images. In short, it is preferable that the commander 10 displays the first and second OSD images so as to become images corresponding to the notification-required event and the device specified in step S13 when the images are displayed so as to overlap each other.

Figure 7A:
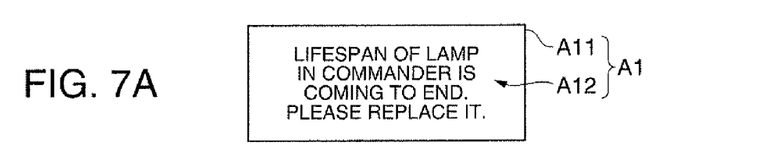
FIGS. 7A to 7C are views showing examples of an OSD image displayed in a modification example.
Figure 7B:
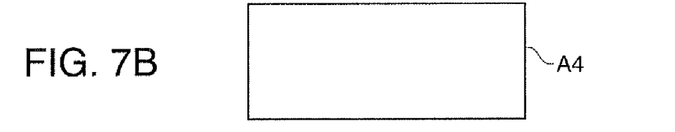

FIGS. 7A to 7C are views showing examples of the OSD image displayed in this modification. FIG. 7A shows the same first OSD image A1 as that shown in FIG. 6A. In practice, the first OSD image A1 has a rectangular image A11 filled with one black color and an image A12 showing a white character string. In FIG. 7A, the image A11 is shown as a white rectangle, and the image A12 is shown as a black text for easy understanding. FIG. 7B shows a second OSD image A4 that is a rectangular image having the same size as the image A11. In practice, the second OSD image A4 is an image filled with one black color. In FIG. 7B, for easy understanding, the image A4 is shown as a white rectangle.

Figure 7C:
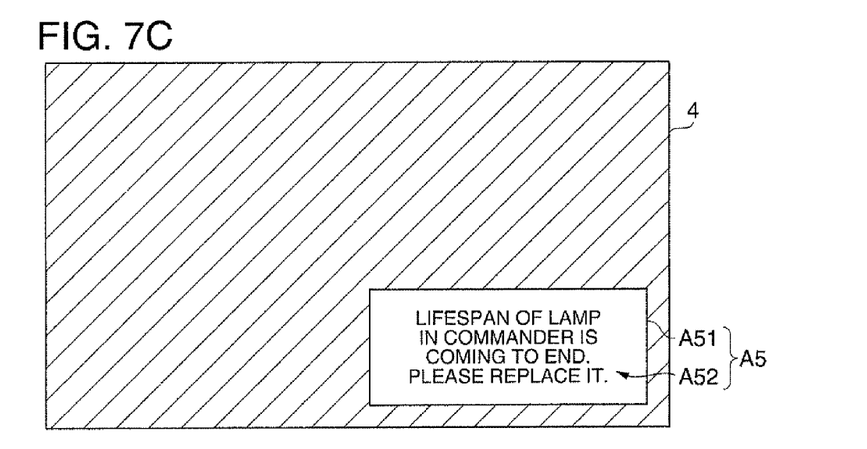

FIG. 7C shows a state where the first and second OSD images A1 and A4 are projected to the OSD image region B1 of the display region 4 shown in FIG. 6C. An OSD image A5 expressed by the first and second OSD images A1 and A4 overlapping each other is displayed in the OSD image region B1. The OSD image A5 has a rectangular image A51 and an image A52 showing the character string "The lifespan of the lamp in the commander is coming to an end. Please replace it". As described above, the second OSD image A4 is an image filled one black color. For this reason, in the OSD image A5, the same image as the first OSD image A1 is shown as it is. If an image filled with one white color is projected instead of the second OSD image A2, the white character string shown in this image and the white character string shown in the image A12 are mixed. As a result, it becomes difficult for the user to identify the content of the character string. The commander 10 according to this modification example displays the image A12 of the character string, which shows the content to be notified, in a white color and the image A11 and the OSD image A4 as the background in a black color so that the user can identify these images.

The OSD image displayed in the OSD image region B1 has a portion (notification portion) showing the content notified to the user and a portion (background portion) as its background. The notification portion is an image showing the result specified by the commander 10 in step S13 shown in FIG. 5. The commander 10 displays the first and second OSD images such that the notification portion and the background portion can be distinguished from each other. Specifically, the commander 10 displays an OSD image in which the contrast values of the notification portion and the background portion are set to values allowing the user to identify notification portion. The OSD image shown in FIGS. 7A to 7C is an example. In this example, the commander 10 displays the second OSD image A4 with one color (black), and display the first OSD image A1, which shows a notification portion, with a color (white) other than the one color. In this case, in the first OSD image A1, the image A12 actually shows the notification portion, and the image A11 and the second OSD image A4 show the background portion.

In addition, the commander 10 may display the second OSD image using a plurality of colors instead of one color, for example. In this case, the commander 10 displays the first OSD image, which shows the notification portion described above, in a color that can be distinguished from these colors. In addition, the commander 10 may display the content of the first and second OSD images reversely. In short, it is preferable that the commander 10 display one of the first and second OSD images in a predetermined color (one or more colors) and display an image showing the above-described notification portion as the other image in a color that can be distinguished from the predetermined color. In this case, the display control unit 103 shown in FIG. 4 displays the first OSD image in a predetermined color or displays the first OSD image that shows the result specified by the specification unit 102 in a color that can be distinguished from the predetermined color. When the display control unit 103 displays the first OSD image in a predetermined color, the output unit 104 outputs a control signal to display the second OSD image that shows the result specified by the specification unit 102 in a color that can be distinguished from the predetermined color. In addition, when the display control unit 103 displays the first OSD image in the above-described distinguishable color, the output unit 104 outputs a control signal to display the second OSD image in the predetermined color.

After displaying an OSD image in the OSD image region B1, the commander 10 may change the content shown in this OSD image.

Figure 8A:
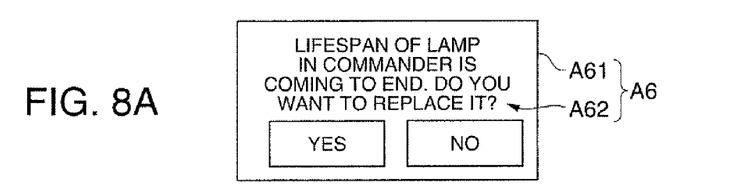
FIGS. 8A and 8B are views showing other examples of the OSD image.
Figure 8B:
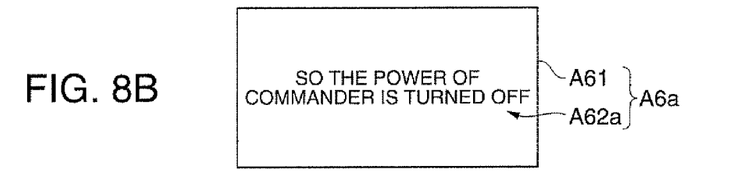

FIGS. 8A and 8B are views showing other examples of the OSD image displayed in the OSD image region B1. FIG. 8A shows an OSD image A6, and FIG. 8B shows an OSD image A6a in which the displayed content is changed. The OSD image A6 has the same rectangular image A61 as the image A11 and an image A62 showing the character string "The lifespan of the lamp in the commander is coming to an end. Do you want to replace it?" and "YES" and "NO". The portions "YES" and "NO" of the image A62 can be selected by the operation of the user. The commander 10 displays the OSD image A6a when the portion "YES" is selected, for example. The OSD image A6a has an image A61 and an image A62a showing the character string "This will turn off the power of the commander". The commander 10 performs an operation to turn off its power after displaying the OSD image A6a for a certain period of time.

When displaying the OSD images shown in FIGS. 8A and 8B, if the same first and second OSD images are displayed as shown in FIGS. 6A to 6D, the commander 10 should change these OSD images in synchronization with each other. If the changes of these OSD images cannot synchronize with each other, images having different contents are mixed due to them overlapping for a period until the other OSD image changes after one OSD image changes. Accordingly, an OSD image which is difficult for the user to see is displayed for this period. In such a case, the commander 10 according to this modification example changes only an image showing the notified content, such as the first OSD image A1 shown in FIG. 7A, but does not change a monochrome image, such as the second OSD image A4. That is, the commander 10 does not need to perform the above-described synchronization. In other words, even if the commander 10 does not synchronize the first and second OSD images with each other, it is possible to display an image that the user can see easily.

Second Modification Example

Although the commander 10 displays one of the first and second OSD images in one color in the first modification example, the invention is not limited to this. In short, it is preferable that an image such as the OSD image A5 shown in FIG. 7C be displayed by the first and second OSD images that are projected to the OSD image region B1 so as to overlap each other.

Figure 9A:
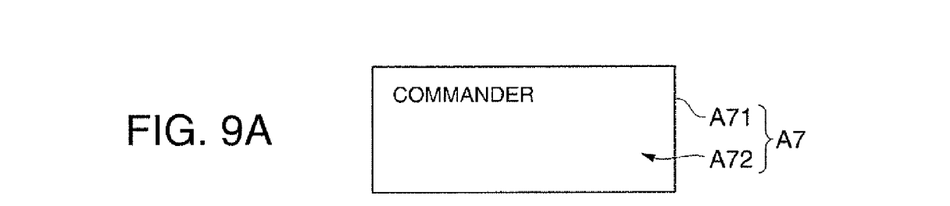
FIGS. 9A and 9B are views showing examples of an OSD image displayed in a modification example.
Figure 9B:
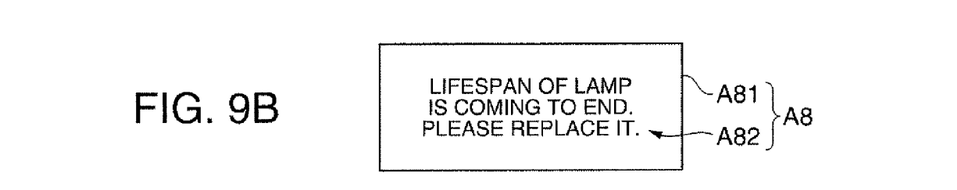

FIGS. 9A and 9B are views showing examples of the OSD image displayed in the OSD image region B1 in this modification example. FIG. 9A shows a first OSD image A7, and FIG. 9B shows a second OSD image A8. The first OSD image A7 has the same rectangular image A71 as the image A11 and an image A72 showing the character string "commander". The second OSD image A8 has the same rectangular image A81 as the image A11 and an image A82 showing the character string "The lifespan of the lamp is coming to an end. Please replace it.". When these OSD images are projected to the OSD image region B1, the OSD image A5 shown in FIG. 7C is displayed. In this case, the images A72 and A82 become the notification portion described above, and the images A71 and A81 become the background portion. Thus, the commander 10, according to this modification example, displays the result specified in step S13 by displaying images showing the character strings, such as the images A72 and A82, in combination. That is, the commander 10 can share one item of image data for a common content portion of the images showing the character strings. In this manner, the commander 10 can reduce the amount of image data stored in the storage unit 120 compared with a case where an image is not displayed in combination unlike this modification example.

Third Modification Example

Although the commander 10 displays the first and second OSD images with the same size such that the entire images overlap each other in the embodiment and the modification examples described above, the invention is not limited to this. For example, the commander 10 may display the first and second OSD images having different sizes, or may display the first and second OSD images such that parts of the first and second OSD images do not overlap each other.

Figures 10A, 10B:
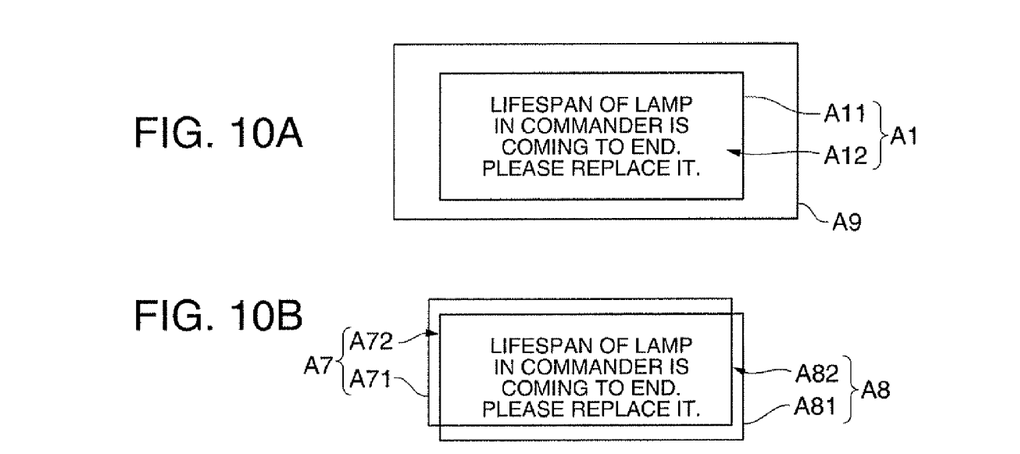
FIGS. 10A and 10B are views showing examples of first and second OSD images in a modification example.

FIGS. 10A and 10B are views showing examples of the first and second OSD images in this modification example. FIG. 10A shows a state where the first OSD image A1 shown in FIG. 7A and a second OSD image A9, which is obtained by increasing the size of the second OSD image A4 shown in FIG. 7B, are displayed so as to overlap each other. In this case, the first OSD image A1 is displayed such that the entire portion overlaps the second OSD image A9. In this manner, the image A12 which is a notification portion is not mixed with an image displayed in a region other than the first and second OSD image regions. Accordingly, a situation where the character string shown in the image A12 is mixed with other images and it is difficult to see the character string does not occur.

FIG. 10B shows a state where the first and second OSD images A7 and A8 shown in FIGS. 9A and 9B are further shifted and displayed than in the case shown in FIGS. 9A and 9B. In FIG. 10B, the images A72 and A82 showing the character strings are displayed in a portion where the black rectangular images A71 and A81 overlap each other. In this manner, the images A72 and A82 which are notification portions are not mixed with an image displayed in a region other than the first and second OSD image regions. Also in this case, a situation where the character strings shown in the images A72 and A82 are mixed with other images and it is difficult to see the character strings does not occur. As described above, in short, it is preferable that the commander 10 displays the first and second OSD images such that the image as a notification portion between the first and second OSD images is not mixed with an image displayed in a region other than the first and second OSD image regions.

Fourth Modification Example

Although the display system 1 includes two projectors in the embodiment described above, the display system 1 may include three or more projectors. Also in this case, there is one projector that transmits a command used in the stack display, that is, there is one commander, and the other projectors are slaves. In this case, there are three methods of connecting projectors to each other through the communication line 30.

Figure 11A:
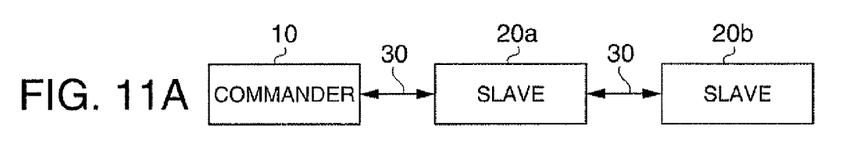
FIGS. 11A to 11C are views showing a method of connecting three projectors.
Figure 11B:
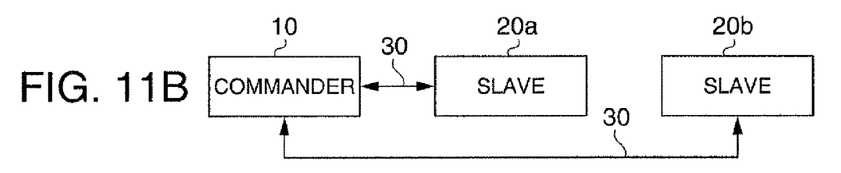
Figure 11C:
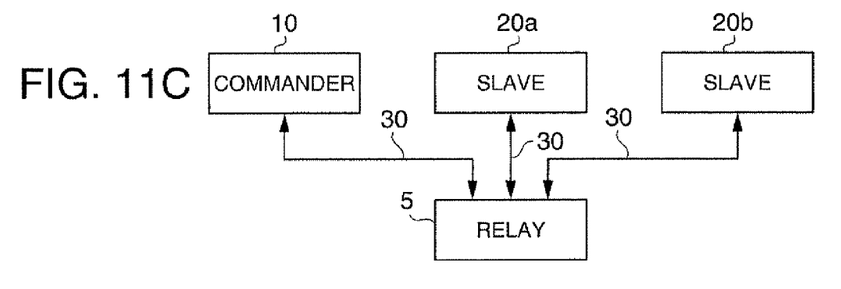

FIGS. 11A to 11C are views showing methods of connecting projectors to each other in a display system including three projectors. FIG. 11A shows a case where the commander 10 and slaves 20a and 20b are connected in series in this order. In this case, the commander 10 transmits a command to the slave 20b through the slave 20a. The signal transmission unit shown in the FIG. 4 in the slave 20b transmits data to the commander 10 through the slave 20a. FIG. 11B shows a case where the commander 10 is connected to each of the two slaves 20a and 20b in a one-to-one manner. FIG. 11C shows a case where three projectors are connected to each other through a relay 5. In the cases shown in FIGS.

11B and 11C, all signal transmission units of the slaves 20a and 20b transmit data to the commander 10 directly.

Fifth Modification Example

Although the display system performs stack display in the embodiment described above, it is also possible to display images using a method called tiling that displays images side by side (called tiling display). In this case, the commander 10 performs the notification process using a different method from that at the time of stack display. Hereinafter, the notification process according to this modification example will be described with reference to FIG. 12.

Figure 12:
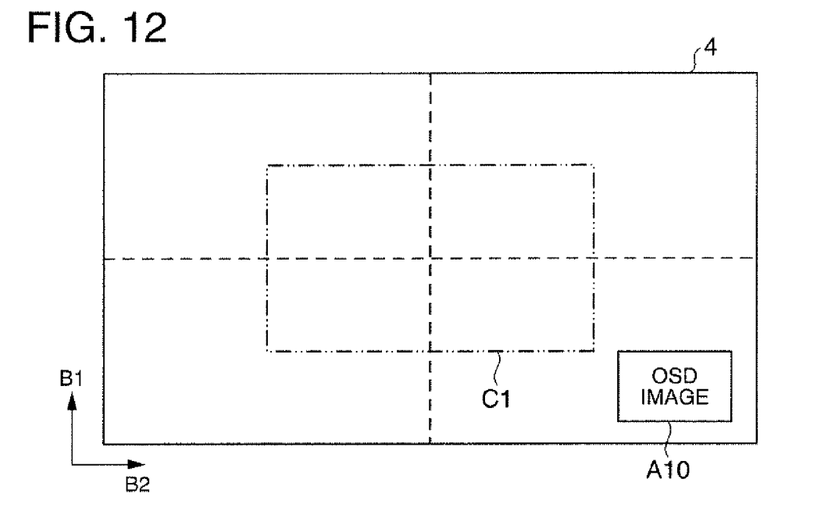
FIG. 12 is a view showing an example of the OSD image displayed in a display region that is tiling-displayed.

FIG. 12 is a view showing an example of the OSD image displayed in the display region 4 under tiling display. In FIG. 12, the arrow B1 showing a vertical direction and the arrow B2 showing a horizontal direction are shown. In this example, using four projectors, four images are displayed side by side in two rows in each of the horizontal and vertical directions. The dotted line shown in FIG. 12 shows the boundary of each image. In this example, it is assumed that the commander 10 displays an upper left image and three slaves 20 display the other images. The commander 10 stores data, which indicates which image each of the four projectors displays, in the storage unit 120 in advance. In addition, when the commander 10 specifies that the notification-required event has occurred in a certain projector, the commander 10 displays an OSD image A10 corresponding to the specified result. In this case, the commander 10 makes one of the four projectors including itself display the OSD image A10. That is, the other three projectors continue to display the images on display as they are, without displaying OSD images. In this example, the commander 10 makes the slave 20, which displays the lower right image, display the OSD mage A10.

In addition, the commander 10 displays the OSD image A10 outside a region C1 in the middle of the display region 4. This region C1 is a rectangular region that is similar to the display region 4 and that passes through the midpoint of the line from the center to the end of the display region 4 in the vertical direction and the same midpoint in the horizontal direction, for example. The commander 10 stores data indicating the region C1 in the storage unit 120 in advance. This data is data of the coordinates showing the position of the corner of the region C1 in each image, for example. In the case where the OSD image A10 is displayed as a lower right image as in this example, the commander 10 displays the OSD image A10 outside a region (that is, the region C1) on the left and upper sides from the coordinates showing the position of the lower right corner of the region C1.

For example, when displaying a presentation material or a movie, an image displayed in a region near the middle of the display region 4 is an image that the user wants to see rather than an image displayed in a region near the edge in many cases. In such a case, the commander 10 can display the OSD image at the position where it is difficult to hide a portion that the user wants to see. In addition, the region C1 shown in FIG. 12 is an example, and a larger or smaller region than the region C1 may be used. In addition, this region may have a shape other than the rectangular shape, such as an elliptical shape. In short, it is preferable that this region be a region set in advance as a region where the user does not want to display an OSD image and be a region including the middle of the display region 4.

Sixth Modification Example

Although the commander 10 displays the OSD image at the determined position (OSD image region B1 or the like) in the embodiment described above, it is also possible to display the OSD image at a position other than the determined position. For example, the commander 10 may display the OSD image at the position set by the operation of the user, or may move the displayed OSD image by the operation of the user. In this manner, it becomes difficult for an image at the position that the user wants to see to be hidden by the OSD image.

Before the OSD image is displayed by the notification process, the OSD image for setting the brightness or the contrast of an image may be displayed. In addition, there is a case where another notification-required event occurs and the next OSD image is displayed, for a period during which the OSD image is displayed by the notification process. In these cases, the commander 10 displays the next OSD image at the position not overlapping the OSD image already displayed. Accordingly, it is possible to prevent a situation where a plurality of OSD images are mixed due to their overlapping and it is difficult for the user to understand the content shown in each OSD image.

Seventh Modification Example

In the embodiment described above, the slave 20 specifies a notification-required event occurring in itself, and the commander 10 determines the occurrence of the notification-required event when data, which indicates the specified notification-required event that is transmitted from the slave 20, is received. In the display system 1, the commander 10 may perform this specification instead of performing this specification by the slave 20. In this case, data showing the results measured by the measurement unit and the temperature measuring unit 270 of the projection unit 240 of the slave 20 is output to the commander 10 through the first communication unit 250. The commander 10 specifies the notification-required event that has occurred in the slave 20 when the use time and temperature of the discharge lamp, which are indicated by the received data, are equal to or greater than the threshold values set for them.

According to this modification example, the control unit 210 of the slave 20 does not need to perform a process of specifying the notification-required event. As a result, it is possible to reduce the processing load. In addition, it is preferable that the commander 10 store each threshold value described above. In this case, for example, when these threshold values are changed so that the occurrence of the notification-required event is specified earlier, it is sufficient for only the commander 10 to perform such a changing operation. As a result, time and effort of the user are reduced. In addition, when the commander 10 specifies the notification-required event only with the data indicating the notification-required event transmitted from the slave 20 as in the embodiment described above, only one data item may be transmitted to perform this specification. In this case, therefore, it is possible to reduce the communication load performed between the commander 10 and the slave 20, compared with a case where the slave 20 transmits other data, such as data indicating the use time or temperature of the discharge lamp, and the commander 10 specifies the notification-required event.

Eighth Modification Example

Although the commander 10 specifies in which device which kind of notification-required event has occurred in step S13 in the embodiment described above, the commander 10 may specify only the occurrence of the notification-required event. In this case, the commander 10 displays an OSD image, which shows that the notification-required event has occurred in a certain projector provided in the display system 1, in the OSD image region B1. Also in this case, the user can select, from the content of the displayed OSD image, whether to continue to use the display system 1 as it is or to stop using the display system 1 to perform predetermined measures.

Ninth Modification Example

The projector provided in the display system is not limited to operating in the stack display mode described above. In an example of the display system, two projectors may be disposed side by side, and the position, shape, or the like of a screen on which each projector displays an image may be adjusted so that the same images are displayed so as to overlap each other. Also in this case, these projectors are connected to each other through the communication line 30 and transmit data to each other in steps S12 and S14 of FIG. 5.

Tenth Modification Example

The invention may be regarded not only as a projection type display device (projector), such as the commander 10 or the slave 20, but also as a display system including these projection type display devices and a method for realizing the process performed by these projection type display devices, such as the notification process shown in FIG. 5.

Eleventh Modification Example

Although the commander and the slave are connected to each other through the communication line 30 to perform cable communication in the embodiment or the modification examples described above, radio communication may be performed. In this case, each of these projectors includes a unit that performs communication on the basis of the Bluetooth (registered trademark) specification, for example, so that radio communication is performed through this unit.

The entire disclosure of Japanese Patent Application No. 2012-75873, filed Mar. 29, 2012 is expressly incorporated by reference herein.

What is claimed is:

1. A projection type display device comprising:
a first display unit that projects and displays an image on a first screen;
a specification unit that specifies, on the basis of data acquired from another projection type display device that projects and displays an image on a second screen or data acquired from the projection type display device, an event occurring in a device of an acquisition source of the data;
a control unit that controls the first display unit to display a first configuration image in a predetermined region of the first screen when the event is specified by the specification unit, the first configuration image and a second configuration image form an image corresponding to the specified event; and
an output unit that outputs a control signal, which causes the other projection type display device to display the second configuration image such that the second configuration image overlaps the predetermined region when outer edges of the first and second screens match with each other, when the event is specified by the specification unit.

2. The projection type display device according to claim 1, wherein the specification unit specifies not only the event that has occurred but also a projection type display device in which the event has occurred,
the control unit makes the first display unit display a first configuration image, the first configuration image and a second configuration image form an image corresponding to the event and the projection type display device specified by the specification unit, and
the output unit outputs a control signal to display the second configuration image on the other projection type display device.

3. The projection type display device according to claim 1, wherein the control unit makes the first display unit display an image, which shows a result specified by the specification unit, as the first configuration image, and
the output unit outputs a control signal to display the same image as the first configuration image on the other projection type display device as the second configuration image.

4. The projection type display device according to claim 1, wherein the control unit displays the first configuration image in a predetermined color, and
the output unit outputs a control signal to display the second configuration image that shows a result specified by the specification unit in a color distinguishable from the predetermined color.

5. The projection type display device according to claim 1, wherein the control unit displays the first configuration image that shows a result specified by the specification unit in a color distinguishable from a predetermined color, and
the output unit outputs a control signal to display the second configuration image in the predetermined color.

6. The projection type display device according to claim 1, wherein when an event occurs in the other projection type display device, the other projection type display device transmits data indicating the event to the projection type display device, and
the specification unit specifies an event, which is indicated by the data received from the other projection type display device, as the event that has occurred in the other projection type display device.

7. A display system comprising:
a first projection type display device including
a specification unit that specifies, on the basis of data acquired from another projection type display device or data acquired from the projection type display device, an event occurring in a device of an acquisition source of the data, and
a first display unit that projects and displays an image on a first screen and that displays a first configuration image in a predetermined region of the first screen when the event is specified by the specification unit, the first configuration image forms an image corresponding to the specified event; and
a second projection type display device as another projection type display device, including
a second display unit that projects and displays an image on a second screen and that displays the second configuration image so as to overlap the predetermined region, the second configuration image forms the image corresponding to the specified event with the first configuration image.

8. The display system according to claim 7, wherein the second display unit displays the second configuration image so as to overlap the predetermined region when outer edges of the first and second screens are made to match with each other.

9. The display system according to claim 7,
wherein the first projection type display device further includes an output unit that outputs a control signal to the second projection type display device when the event is specified by the specification unit, and
the second display unit of the second projection type display device displays the second configuration image on the basis of the control signal output from the first projection type display device.

10. The display system according to claim 7,
wherein the specification unit specifies not only the event that has occurred but also a projection type display device in which the event has occurred,
the first display unit displays a first configuration image which forms an image corresponding to the event and the projection type display device specified by the specification unit, and
the second display unit displays the second configuration image which forms the image corresponding to the event and the projection type display device specified by the specification unit with the first configuration image.

11. The display system according to claim 7,
wherein the first display unit displays an image, which shows a result specified by the specification unit, as the first configuration image, and
the second display unit displays the same image as the first configuration image as the second configuration image.

12. The display system according to claim 7,
wherein the first display unit displays the first configuration image in a predetermined color, and
the second display unit displays the second configuration image that shows a result specified by the specification unit in a color distinguishable from the predetermined color.

13. The display system according to claim 7,
wherein the first display unit displays the first configuration image that shows a result specified by the specification unit in a color distinguishable from a predetermined color, and
the second display unit displays the second configuration image in the predetermined color.

14. The display system according to claim 7,
wherein the specification unit specifies an event, which is indicated by the data received from the second projection type display device, as the event that has occurred in the second projection type display device.

15. The display system according to claim 14,
wherein the second projection type display device includes a signal transmission unit that, when the event occurs in the second projection type display device, transmits data indicating the event to the first projection type display device.

16. A display method comprising:
making a first projection type display device, which includes a display unit that projects and displays an image on a first screen, specify, on the basis of data acquired from a second projection type display device that projects and displays an image on a second screen or the first projection type display device, an event occurring in a device of an acquisition source of the data;
making the first projection type display device control the display unit to display a first configuration image in a predetermined region of the first screen when the event is specified in the specifying, the first configuration image and a second configuration image form an image corresponding to the specified event; and
making the first projection type display device output a control signal, which causes the second projection type display device to display the second configuration image such that the second configuration image overlaps the predetermined region when outer edges of the first and second screens match with each other, when the event is specified in the specifying.

* * * * *